United States Patent
Lu et al.

(10) Patent No.: US 7,961,601 B2
(45) Date of Patent: Jun. 14, 2011

(54) LESSER DISRUPTIVE OPEN SHORTEST PATH FIRST HANDLING OF BIDIRECTIONAL FORWARDING DETECTION STATE CHANGES

(75) Inventors: Wenhu Lu, San Jose, CA (US); Sriganesh Kini, San Jose, CA (US)

(73) Assignee: Ericsson AB, Stockholm (SE)

( * ) Notice: Subject to any disclaimer, the term of this patent is extended or adjusted under 35 U.S.C. 154(b) by 769 days.

(21) Appl. No.: 11/894,249

(22) Filed: Aug. 16, 2007

(65) Prior Publication Data

US 2009/0046579 A1 Feb. 19, 2009

(51) Int. Cl.
*H04L 12/26* (2006.01)
(52) U.S. Cl. .......................................... 370/225
(58) Field of Classification Search .................. None
See application file for complete search history.

(56) References Cited

U.S. PATENT DOCUMENTS

| | | |
|---|---|---|
| 6,590,868 B2 | 7/2003 | Shen |
| 6,768,718 B1* | 7/2004 | Beshai et al. ............. 370/237 |
| 7,003,582 B2 | 2/2006 | Basso et al. |
| 7,327,683 B2* | 2/2008 | Ogier et al. ............... 370/236 |
| 7,756,017 B2* | 7/2010 | Goyal et al. ............... 370/225 |
| 2002/0004843 A1* | 1/2002 | Andersson et al. ........... 709/238 |
| 2007/0189191 A1* | 8/2007 | Ades ............................. 370/254 |
| 2008/0062862 A1* | 3/2008 | Goyal et al. ................. 370/218 |
| 2008/0172582 A1* | 7/2008 | Sinicrope et al. .............. 714/48 |

OTHER PUBLICATIONS

Katz, et al., "Bidirectional Forwarding Detection", Cisco Systems, Mar. 2007, pp. 1-45, http://ietfreport.isoc.org/all-ids/draft-ietf-bfd-base-06.txt.
J. Moy, "RFC 2328—OSPF" Version 2, Ascend Communications, Inc., Apr. 1998, pp. 1-215, http://faqs.org/frcs/rfc2328.html.
PCT International Search Report and Written Opinion for PCT International Appln No. PCT/US2008/073205 mailed Nov. 12, 2008. (9 pages).
International Preliminary Report on Patentability, Application No. PCT/US2008/073205, dated Feb. 16, 2010, 6 pgs.

* cited by examiner

*Primary Examiner* — Anh-Vu Ly
(74) *Attorney, Agent, or Firm* — Blakely Sokoloff Taylor & Zafman, LLP

(57) ABSTRACT

A method and apparatus for processing link down events associated with links between adjacent nodes is described. A node receives link down events associated with a link fault protocol for a link between the node and a neighboring node. In response to receiving the link down event, the node removes a data structure associated with the neighboring node from a forwarding table associated with a routing protocol running on the node. The node reserves the data structure for speedy adjacency recovery. In addition, the node places the neighboring node in the initialize state of the routing protocol.

24 Claims, 13 Drawing Sheets

1100

| ADJACENT STATE | RECEIVED STATE | | |
| --- | --- | --- | --- |
| | DOWN | INIT | UP |
| DOWN | INIT | INIT | DOWN |
| INIT | INIT | UP | UP |
| UP | INIT | UP | UP |

FIGURE 11

LESSER DISRUPTIVE OPEN SHORTEST PATH FIRST HANDLING OF BIDIRECTIONAL FORWARDING DETECTION STATE CHANGES

FIELD OF THE INVENTION

The present invention relates generally to network communications. More particularly, this invention relates to handling of link state changes in routing protocols.

BACKGROUND

In a modern computer network, or simply a network, routers route data between various networks by forwarding the packets ("packets") to the next router on a path to the packet destination. Typically, a router employs a forwarding table to enable such forwarding decisions. When a link between routers goes down, the routers can use alternate routes for data forwarding. Furthermore, one or more of the routers updates the forwarding table to reflect that the link is down.

FIG. 1 (Prior Art) is a block diagram illustrating one embodiment of a network. In FIG. 1, routers 102A-D couple to networks 104A-D, respectively. Router 102A-D acts as a junction between two of more networks 104A-D via links 106A-F. Links 106A-F represent connections and/or coupling between respective routers 102A-D. For example and by way of illustration, router 102A couples to routers 102B-D via links 106A, E, and D, respectively. Furthermore, router 102B couples to routers 102C-D via links 106B and F, respectively, while router 102C couples to router 102D via link 106C. The coupling of routers 102A-D via links 106A-F allows devices in one network to access other devices in another network. For example and by way of illustration, devices in network 104A can access other devices in network 104B via router with links 106A-F.

Typically, routers 102A-D employ routing algorithms that are used to determine which links 106A-F are available to access network 104A-D. Routing algorithms discover routes to other network as well exchanging known routes with other routers 102A-D. Typically routing algorithms use a forwarding information table that designates which routes are used to access a given network 104A-D. Routing algorithms are well known in the art and typically depend on a routing protocol. A routing protocol is set of rules used by routers to determine the most appropriate path(s) into which they should forward packets towards their intended destinations. Example of routing protocols known in the art are Open Shortest Path First (OSPF), Intermediate System to Intermediate System (IS-IS), Border Gateway Protocol (BGP), Routing Information Protocol (RIP), etc.

One problem that typically occurs is that one of links 106A-F will sometimes go down, meaning that network communication across the downed link is not available. When one of link 106A-F goes down, router 102A-D detects that link down using one of a various methods known in the art associated with the routing protocol being used by router 102A-D. For example and by way of illustration, if router 102A-D is using OSPF for its routing protocol, router 102A-D detects a down link by determining if three consecutive hello packet are not received over a period of time. In one embodiment, this period of time is thirty seconds. However, the problem with this approach is that each routing protocol has a different mechanism for link down detection and link down detection may take minutes.

FIG. 2 (Prior Art) is a block diagram illustrating various routing protocols using Bidirectional Forwarding Detection (BFD) to detect faults between two forwarding engines. BFD is a routing protocol independent mechanism used to detect a link 106A-F down between two routers 102A-D. BFD provides a low-overhead detection of link down for various types of links (Ethernet, tunnels, virtual circuits, etc.). BFD establishes a session between two endpoints on a link. For example and by way of illustration, BFD would establish a session for link 106A between routers 102A-B. BFD does not discover the links, but typically relies on a routing protocol such as OSPF or IS-IS to bootstrap BFD with the link and endpoint information.

Once BFD is running, an overlaying routing protocol gets link events from BFD. As shown in FIG. 2, different routing protocols can receive the link events from BFD. In FIG. 2, routing protocols 202A-N rely on BFD 204 for link events 206. In addition, routing protocols, such OSPF 202A or IS-IS 202B can send BFD session bootstrap information 208 to BFD.

BFD detects link downs very quickly, on the order of tens of milliseconds. Once a link is detected, a BFD-Down event is sent to the controlling routing protocol. The overlaying routing protocol receives the event and treats the link as down. Nonetheless, because BFD is routing protocol independent and thus not part of any routing protocol standard, how the routing protocol treats the BFD-Down event is implementation dependent. For example and by way of illustration, current implementations for OSPF treat BFD-Down event by taking the OSPF state for that link to the DOWN state. One problem with this implementation is that typically the data structure associated with the neighboring router is deleted. This deprives the router's BFD process of monitoring the link between the router and neighboring router because the underneath transport no longer maintains the corresponding BFD session. Furthermore, because BFD detects link downs very quickly, BFD session can go up and down quickly, leading to link flapping.

BRIEF SUMMARY

A method and apparatus for processing link down events associated with links between adjacent nodes is described. A node receives link down events associated with a link fault protocol for a link between the node and a neighboring node. In response to receiving the link down event, the node removes a data structure associated with the neighboring node from a forwarding table associated with a routing protocol running on the node. The node reserves the data structure in an adjacency table for speedy adjacency recovery. In addition, the node places the neighboring node in the initialize state of the routing protocol.

BRIEF DESCRIPTION OF THE DRAWINGS

The present invention is illustrated by way of example and not limitation in the figures of the accompanying drawings in which like references indicate similar elements.

FIG. 11 is a table illustrating an exemplary state diagram of a BFD-Down event received in a IS-IS database exchange neighbor state diagram according to one embodiment of the invention.

DETAILED DESCRIPTION

Figure 1:
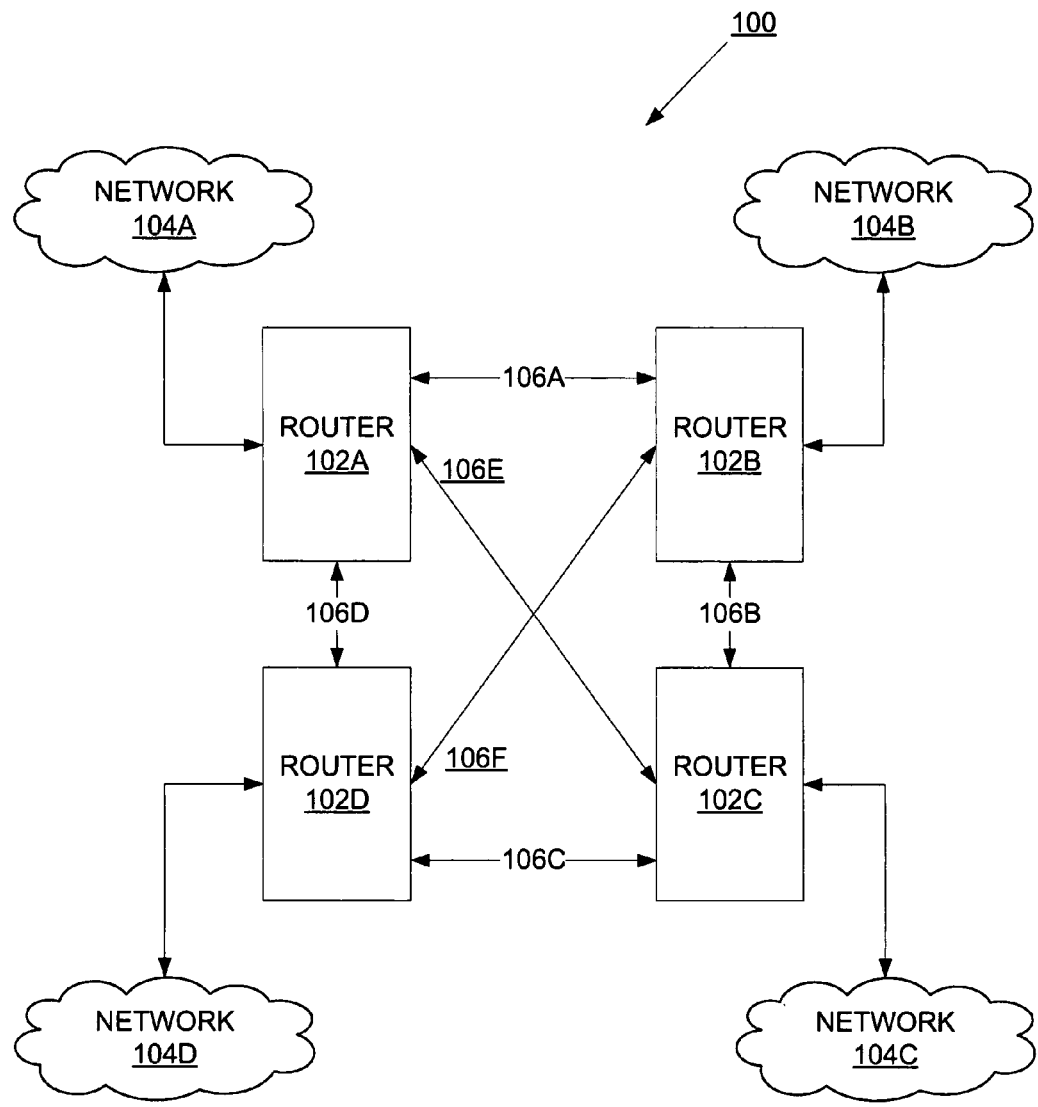
FIG. 1 (Prior Art) is a block diagram illustrating one embodiment of a network.
Figure 2:
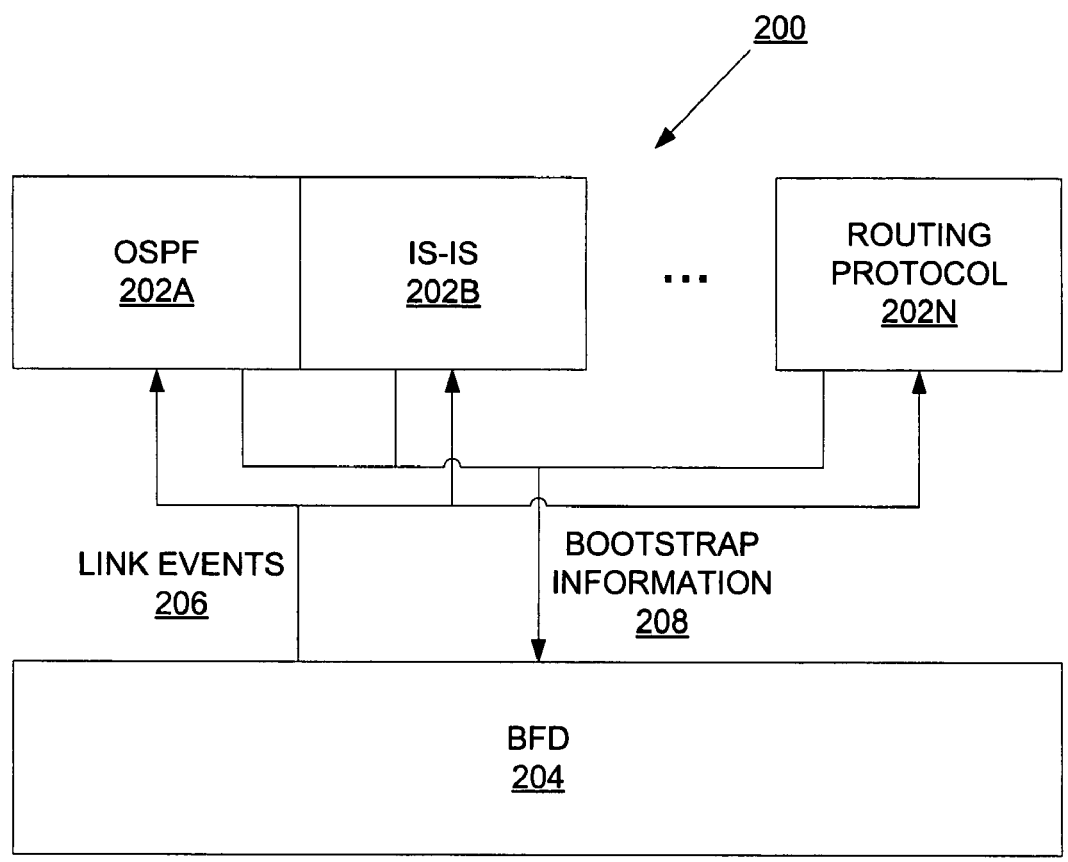
FIG. 2 (Prior Art) is a block diagram illustrating various routing protocols using BFD to detect faults between two forwarding engines.

A node that processes link down events from a link fault protocol for use with a routing protocol is described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the term "coupled," along with its derivatives, is used. "Coupled" may mean that two or more elements are in direct physical or electrical contact. However, "coupled" may also mean that two or more elements are not in direct contact with each other, but yet still co-operate or interact with each other.

Exemplary embodiments of the invention will now be described with reference to FIGS. 3-13. In particular, the operations of the block and flow diagrams in FIGS. 3-10 and 12 will be described with reference to the exemplary embodiment of FIG. 13. However, it should be understood that the operations of these block and flow diagrams can be performed by embodiments of the invention other than those discussed with reference to FIGS. 3-10 and 12 and that the embodiments discussed with reference to FIG. 13 can perform operations different than those discussed with reference to these flow diagrams.

A node that processes link down event from a link fault protocol for use with a routing protocol is described. According to one embodiment of the invention, a node receives link down events associated with a link fault protocol. The link down events is generated if the link between the node and a neighboring node is down. The node routing module processes the link down event and updates forwarding table for the relevant routing protocol running on the node. While in one embodiment, the node updates an OSPF forwarding table, in an alternate embodiment, the node updates a forwarding table associated with the same and/or other routing protocols (IS-IS, etc.). When a link down event is received, the data structure associated at the downed link is not deleted, but instead is saved for use later. Furthermore, the link state for the neighboring node is placed in the Init state, which allows for rapid recovery of the link when the link comes back up. According to another embodiment of the invention, a dampening watchdog timer is used to control links that oscillate between link up and link down.

Figure 3:
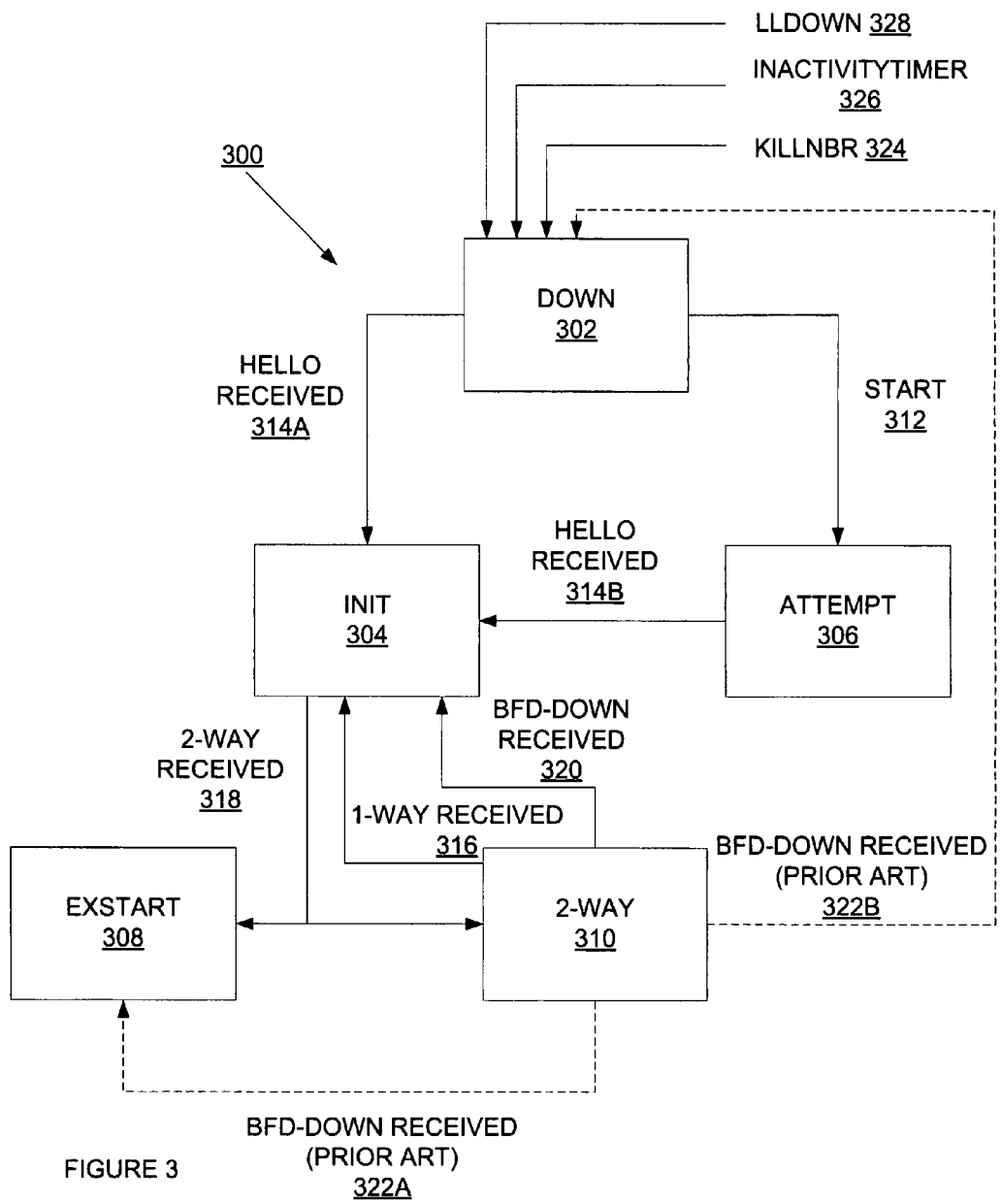
FIG. 3 is a block diagram illustrating an exemplary state diagram of a BFD-Down event received in an OSPF neighbor hello state changes diagram according to one embodiment of the invention.
Figure 4:
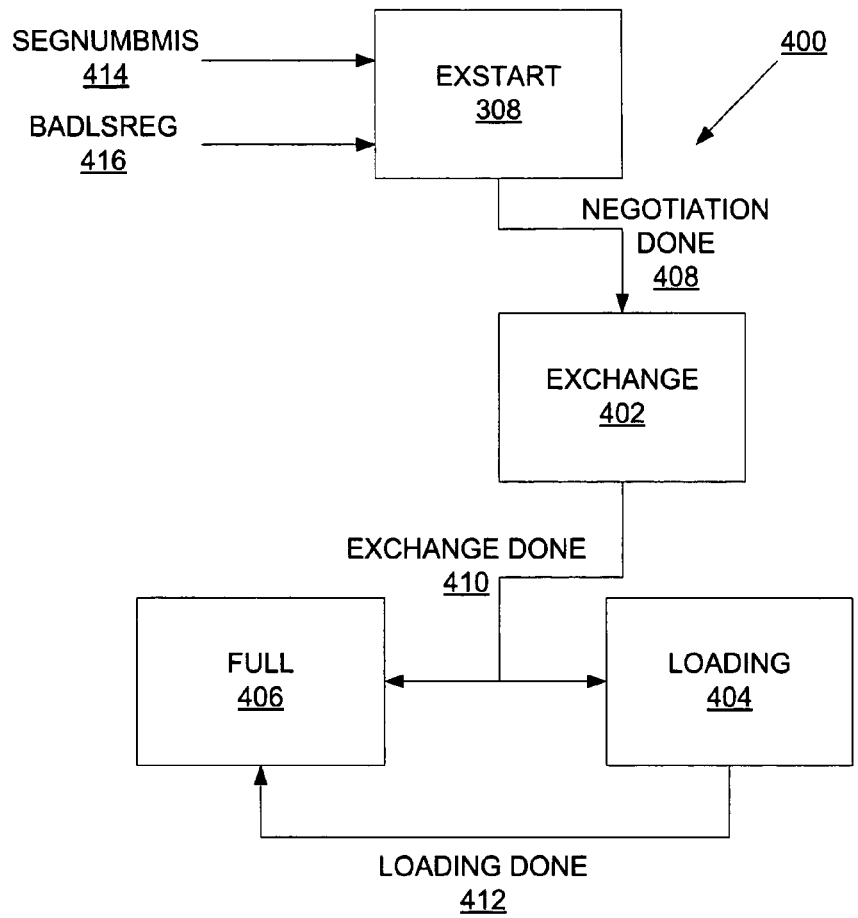
FIG. 4 is a block diagram illustrating an exemplary state diagram of a BFD-Down event received in an OSPF database exchange neighbor state diagram according to one embodiment of the invention.
Figure 4:
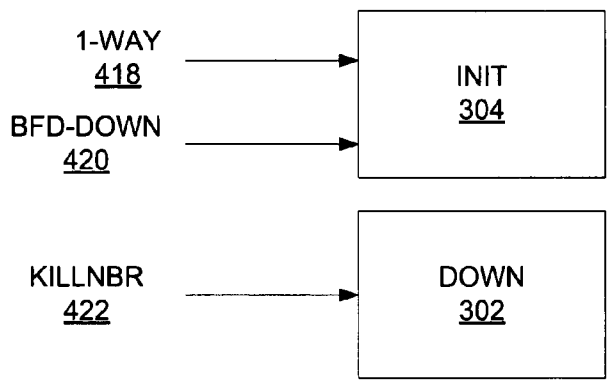

FIGS. 3-4 illustrate neighbor state diagrams between adjacent router 102A-D nodes according to one embodiment of the system. A neighbor state is the state of the conversation between the routing protocols running on each of the routers 102A-D nodes. FIG. 3 is a block diagram illustrating an exemplary state diagram 300 of a BFD-Down event received in an OSPF neighbor hello state changes diagram according to one embodiment of the system. In FIG. 3, several OSPF neighbor states are illustrated that represents progressing functionality between one node and another neighboring node. Changes between the states are triggered by certain events. In one embodiment, Down 302 is the initial state of the neighbor conversation, indicating that no recent information has bee received from the neighbor node. From the down state, a Hello Received event changes the neighbor state to an Init 304 state. The Init 304 state indicates that a hello packet has been received from the neighbor node, but that bidirectional communication has not been established with the neighbor. In OSPF, Hello packets are used to establish and maintain neighbor relationships. For new neighbors, Hello packets are used to discover neighboring nodes. For existing neighbors, Hello packets act as keepalives to let nodes know other nodes are still functional.

A node in the Attempt 306 state if the node that has no recent information for the neighbor node and makes a concerted effort to contact the neighbor. From the Attempt 306 state, a HelloReceived 314B event triggers a change to the Init 304 state described above.

A 2-wayReceived 318 event received by the node triggers a change to either the 2-Way 310 state or the ExStart 308 state. A 2-WayReceived 310 state indicates that bidirectional communications has been realized between the two nodes because the node is seeing itself in the neighbor node's Hello packet. An ExStart 308 state occurs when two neighboring nodes are creating an adjacency between the two nodes. Neighboring nodes that have synchronized link state databases are considered adjacent.

While a node is in one of the states illustrated in FIG. 3, the node can receive a 1-Way or BFD-Down Received Event 316A-C. A 1-Way Event indicates that a Hello packet has been received node from the neighbor node, but the receiving node is not indicated in the Hello packet. The 1-Way Event causes the OSPF neighbor state to drop to less functionality.

For example, a 1-Way event 316 received by a node in the 2-Way 310 state causes the node to revert to an Init 304 state.

Similar to the 1-Way 316 event, in one embodiment a BFD-Down 320 event causes the node state to drop in functionality. A BFD-Down event is generated by the link state detection protocol BFD and is received by the OSPF protocol stack. In one embodiment, the BFD-Down 320 event causes the node in a 2-Way state 310 to revert to the Init 304 state. At the Init 304 state, the node waits for a 2-WayReceived 318 event to bring the node back to 2-Way 310 state. In an alternate embodiment, a BFD-Down 320B event received by a node in the ExStart 308 state causes a node state change to the Init 304 state.

Alternatively, in alternate embodiments, a BFD-Down 322A-B event can trigger a change to either the ExStart 308 state or the Down 302 state affecting the designated router relationship can delay the time it takes to bring a link back up. In one embodiment, BFD-Down 322A-B can affect designated router relationship of a multi-access network, which is the starting point of ExStart 308 state.

As will be shown in FIG. 5 below, having a BFD-Down 320A-B event return the node to the Init 304 state allows the OSPF neighbor state to recover much faster that from a Down 302 state. Moving a node to the Down 302 state means that the data structure created for the neighbor is deleted and needs to be recreated in order to move the node back up to the 2-Way 310 state. This can delay a recovery of a link for up to forty seconds. Instead, by changing the state to Init 304 state, a node can save the neighbor data structure, which can then be quickly re-used when a BFD-Up event is received. Re-using the saved neighbor structure cuts down the recovery time for the link down to seconds.

In addition, there are several other events that force a change in the node to a lower functionality state. A KillNbr 324 event forces a change in the node to the Down 302 state and occurs when there is an indication that all communication with the neighbor is now impossible. In addition, Inactivity Timer 326 and/or LLDown 328 events also force a Down 302 state. Inactivity Timer 328 events occur when no Hello packet have been sent by the neighbor, while a LLDown 328 event occurs when a lower level protocol indicates that the neighbor is unreachable. While in one embodiment, a neighbor is unreachable because of a power failure, in alternate embodiments, a neighbor is unreachable for other reasons (e.g., disconnected link or other physical link failure). In this embodiment, LLDown 328 events can warrant an overlaying protocol and/or application response.

FIG. 4 is a block diagram illustrating an exemplary state diagram of a BFD-Down event received in an OSPF database exchange neighbor state diagram according to one embodiment of the system. As stated above, a node in the ExStart 308 state is the first state in creating an adjacency between the node and a neighboring node. A Negotiation Done 408 event triggers a change in the node to an Exchange 402 state. A Negotiation Done 408 event occurs when the master/slave relationship between the node and neighbor node has been negotiated and signals the start of the sending and receiving of OSPF database description. The Exchange 402 state is when the node is describing its entire link state database to the neighbor node by sending database description packets to the neighbor.

An Exchange Done 410 event triggers a change in the node to either the Loading 404 state or the Full 406 state. An Exchange Done 410 event occurs when the node and neighboring node have successfully transmitted a full sequence of the OSPF database description for those nodes. The Loading 404 state is when the node has sent link state requests to the neighboring node but has not received them. The Full 406 state occurs when the node and neighboring node are fully adjacent. Furthermore, a Loading Done 412 event triggers a change on the node from the Loading 404 state to the Full 406 state. A Loading Done 412 event occurs when the link state updates have been received for all out of date portions of the OSPF database.

A number of events bring the node to a lower functionality state. For example, SeqNumberMismatch 414 or BadLSReg 416 events force a change in the node to the ExStart 308 state. As above, a KillNbr 324 event forces a change to the Down 302 state. In a similar fashion as described above, a 1-Way 418 or BFD-Down 420 event forces a change in the node to the Init 304 state.

Figure 5:
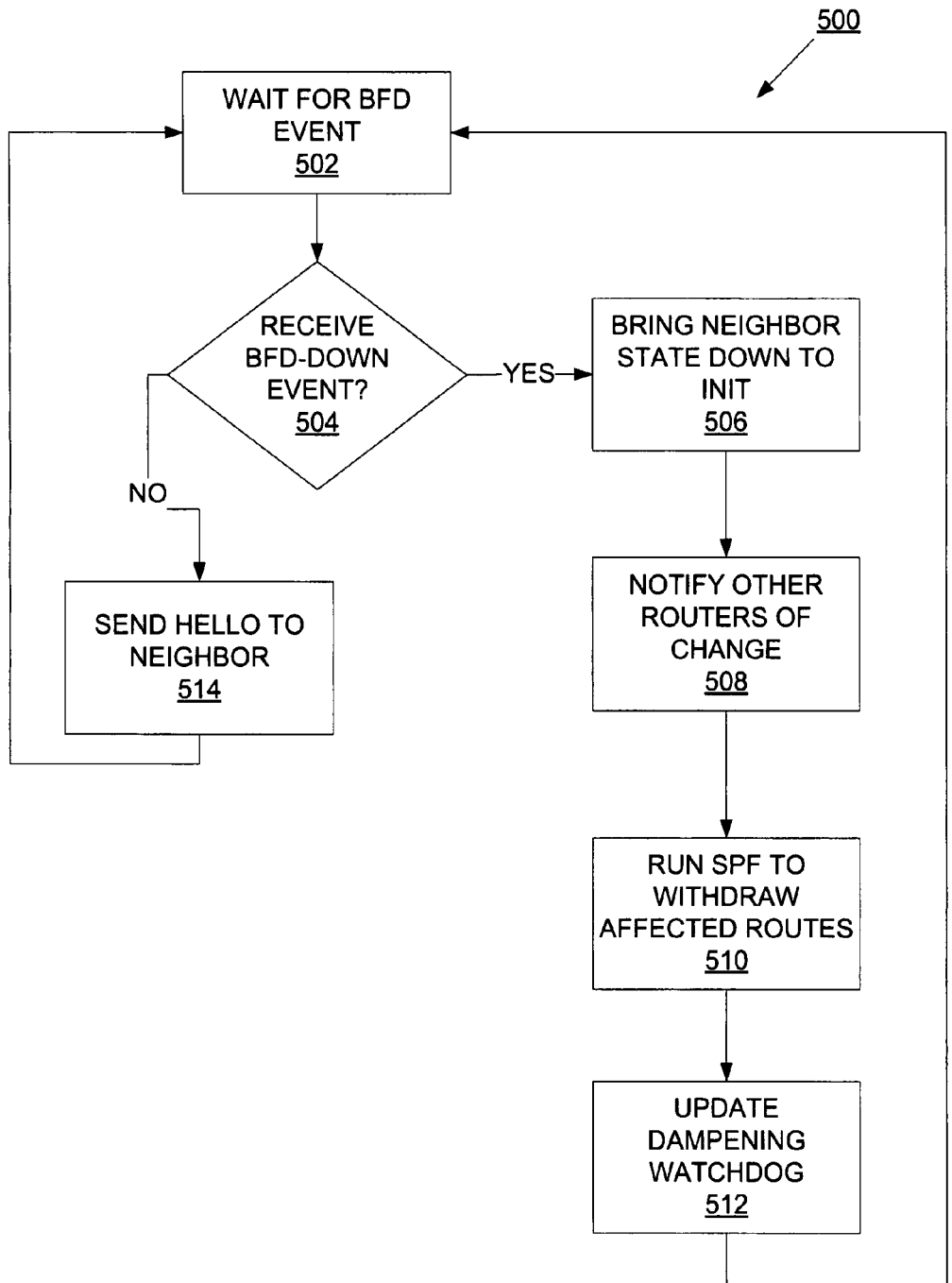
FIG. 5 is an exemplary flow diagram of a BFD event handler according to one embodiment of the invention.

FIG. 5 is an exemplary flow diagram of a method 500 of a BFD event handler according to one embodiment of the system. In FIG. 5, at block 502, method 500 waits for a BFD Event. While in one embodiment, the BFD event is a BFD-Down event, in alternate embodiments, the BFD event can also be another BFD-Event (BFD-Up, etc.) At block 504, method 500 determines if the BFD event is a BFD-Down event. If it is not, and the event is a BFD-Up event, method 500 sends a Hello packet to the neighbor at block 514. Sending of a Hello packet discovers new neighboring nodes and starts the process of establishing a link between a node and a new neighbor node. Furthermore, method 500 uses the saved neighbor structure to bring the link back up.

If the received event is a BFD-Down event, method 500 brings the neighbor link state down to the Init 304 state. A link for a neighboring node is in the "Init" state when a node receives a Hello packet without the node's identifier in the Hello packet. The Init state signals to the routing protocol module that there is a possible neighboring node that can become adjacent. Bringing the neighbor link state down forces the node and the neighboring node to synchronize their respective link state databases. Furthermore, instead of deleting the neighbor data structure, method 500 saves the neighbor data structure describing the neighbor node, including the neighbor's link state database.

At block 508, method 500 notifies other router of the state change. In one embodiment, method 500 sends out messages that notify adjacent routers that the link between the node and neighbor node is down.

At block 510, method 500 runs shortest path first (SPF) to withdraw routes affected by the link down between the node and the neighbor node.

At block 512, method 500 updates dampening watchdog timer. The dampening watchdog timer is used to reduce the churn of the routing databases that can be happen if a link continually goes up and down. Dampening is a feature in some routing protocols that identifies a flapping link by adding a penalty value to the link each time it flaps (changes between available and unavailable). The dampening watchdog is further described in FIG. 8 below.

Figure 6:
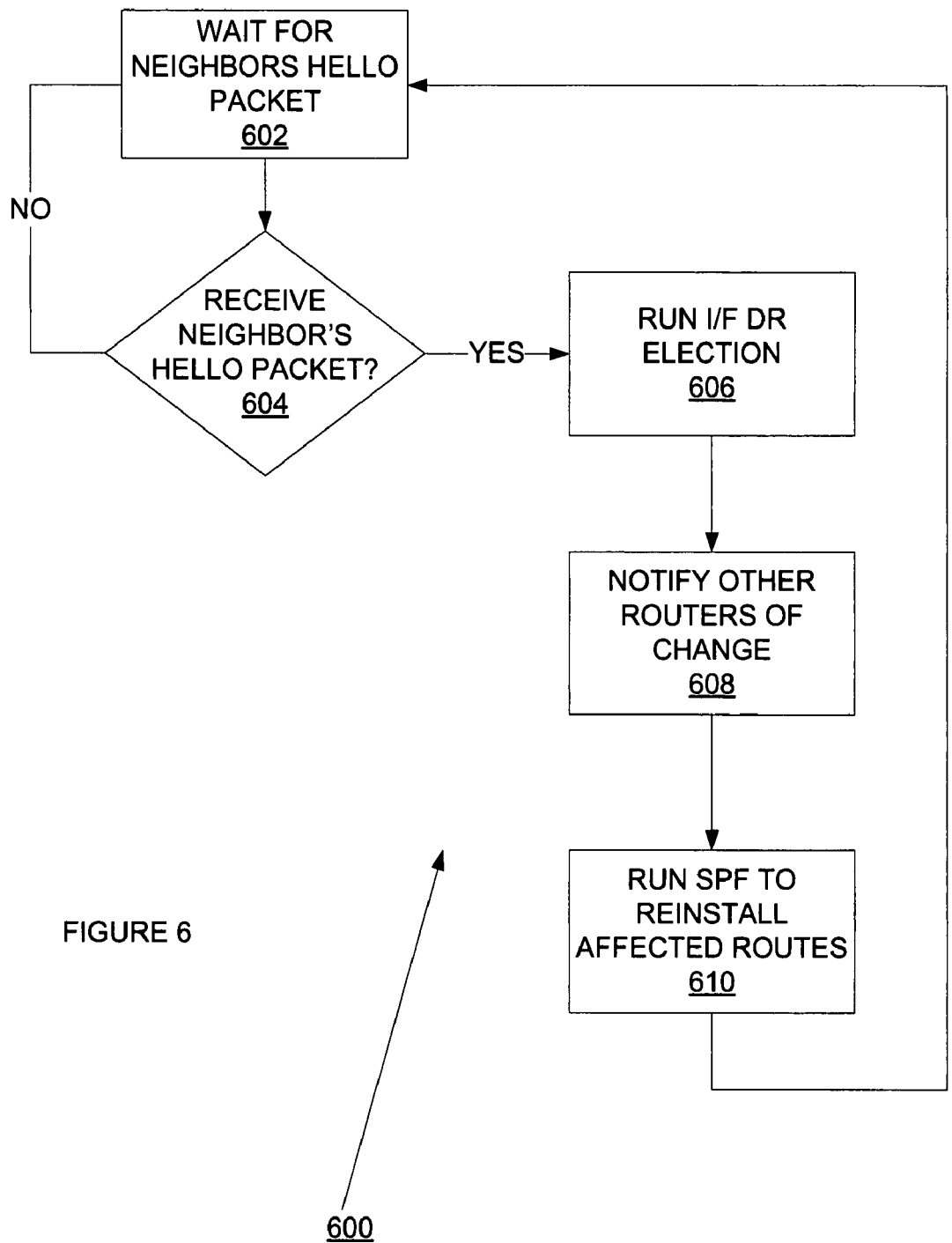
FIG. 6 is an exemplary flow diagram of a neighbor's hello packet event handler according to one embodiment of the invention.

FIG. 6 is an exemplary flow diagram of a method 600 of a neighbor's hello packet event handler according to one embodiment of the system. In FIG. 6, at block 602, method 600 waits for a neighbor's hello packet. As stated above, a hello packet acts as keepalives to let nodes know other nodes are still functional. At block 604, method 600 determines if it has received the hello packet. If not, control moves to block 602. If method 600 does receive a neighbor's hello packet, method 600 runs an interface designated router election at block 604. Nodes elect a designated router and a backup designated router. A designated router determines which routers are adjacent. As stated above, adjacent routers are neighboring routers that have synchronized link state databases. At block 608, method 600 notifies other routers of the change in the link. At block 610, method 610 runs shortest path forward to reinstall the affected routes. Control moves back to block 602.

Figure 7:
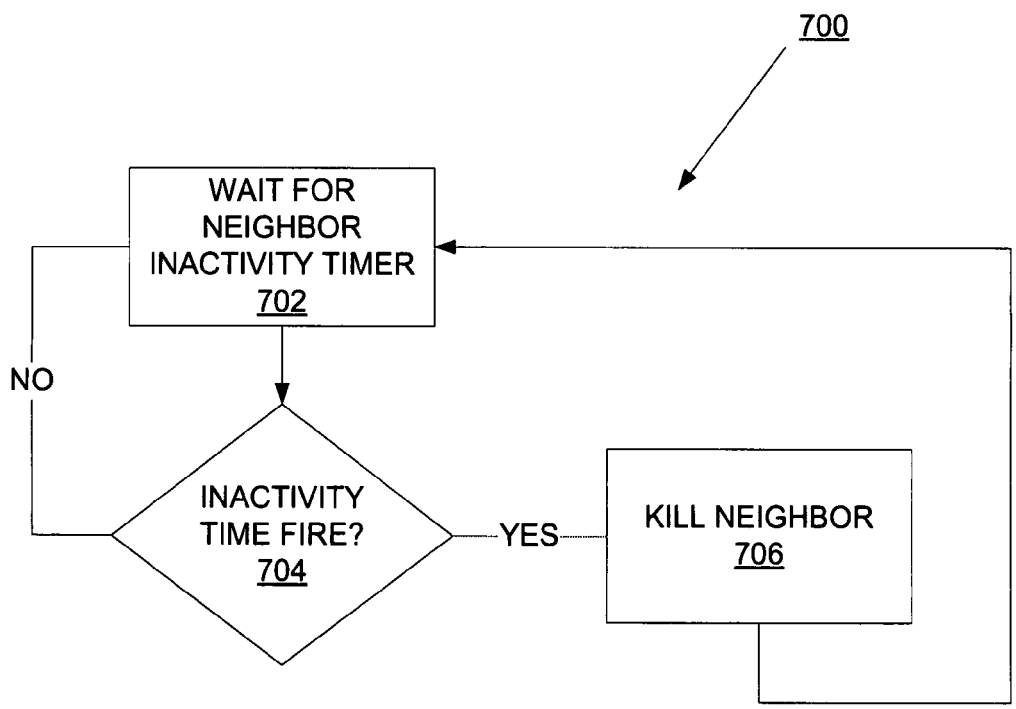
FIG. 7 is an exemplary flow diagram of a neighbor inactivity timer event handler according to one embodiment of the invention.

FIG. 7 is an exemplary flow diagram of a method 700 for a neighbor inactivity timer event handler according to one embodiment of the system. In FIG. 7, at block 702, method 700 waits for a neighbor inactivity timer. The neighbor inactivity timer indicates when a neighbor has been inactive for longer than a threshold. If a neighbor is inactive for too long, the neighbor is considered down, and the neighbor should be removed from the node's forwarding database.

At block 704, method 700 determines if the neighbor inactivity timer has fired. If not, control moves to block 702. If the neighbor activity timer has fired, the neighbor is assumed to be down and method 700 kills the neighbor from the forwarding database, at block 706. In one embodiment, method 700 raises a KillNbr 324 event as described in FIG. 3 above. The KillNbr 324 event causes the node to drop down to the Down 302 state, which deletes the neighbor node from the forwarding database. Control passes to block 702.

Figure 8:
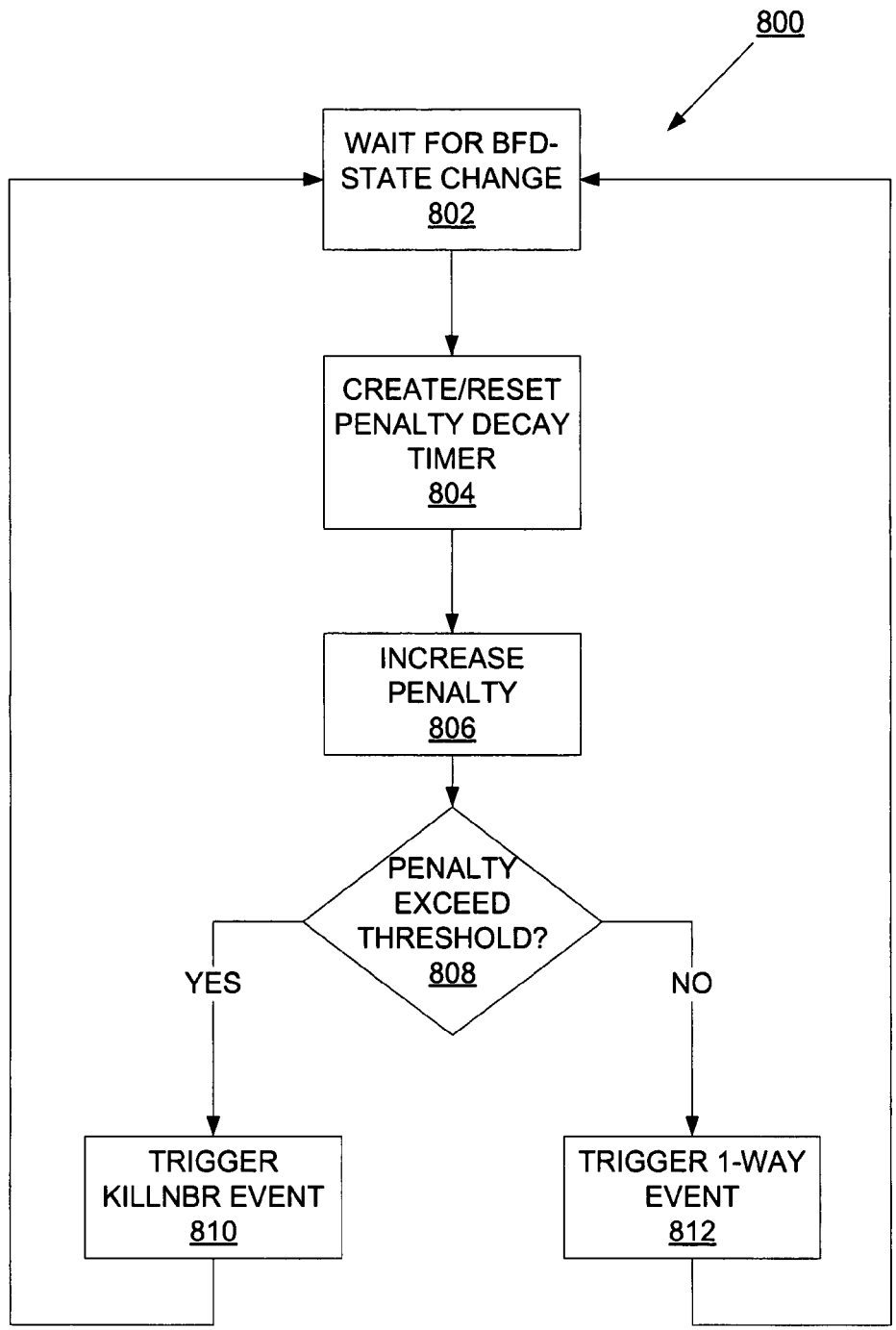
FIG. 8 is a block diagram illustrating an exemplary state diagram of dampening a BFD state change according to one embodiment of the invention.

As described above, dampening is a feature in some routing protocols that is used to control links that oscillate between link up and link down. FIG. 8 is a block diagram illustrating an exemplary flow diagram of a method 800 for dampening a BFD state change according to one embodiment of the system. In FIG. 8, at block 802, method 800 waits for a BFD state change. At block 804, method 800 creates and/or resets a penalty decay timer. In effect, method 800 intercepts a BFD event and determines whether to forward the BFD event or to trigger a different event, based on the current conditions of the link. The penalty decay timer indicates whether to trigger the BFD-Down 322A or KillNbr 324 events to the routing engine. A BFD-Down 322A event is suitable for relatively isolated initial link down events, such as intermittent link downs. On the other hand, a KillNbr 324 event is triggered when BFD-Down 322A events are rapidly generated.

Figure 9:
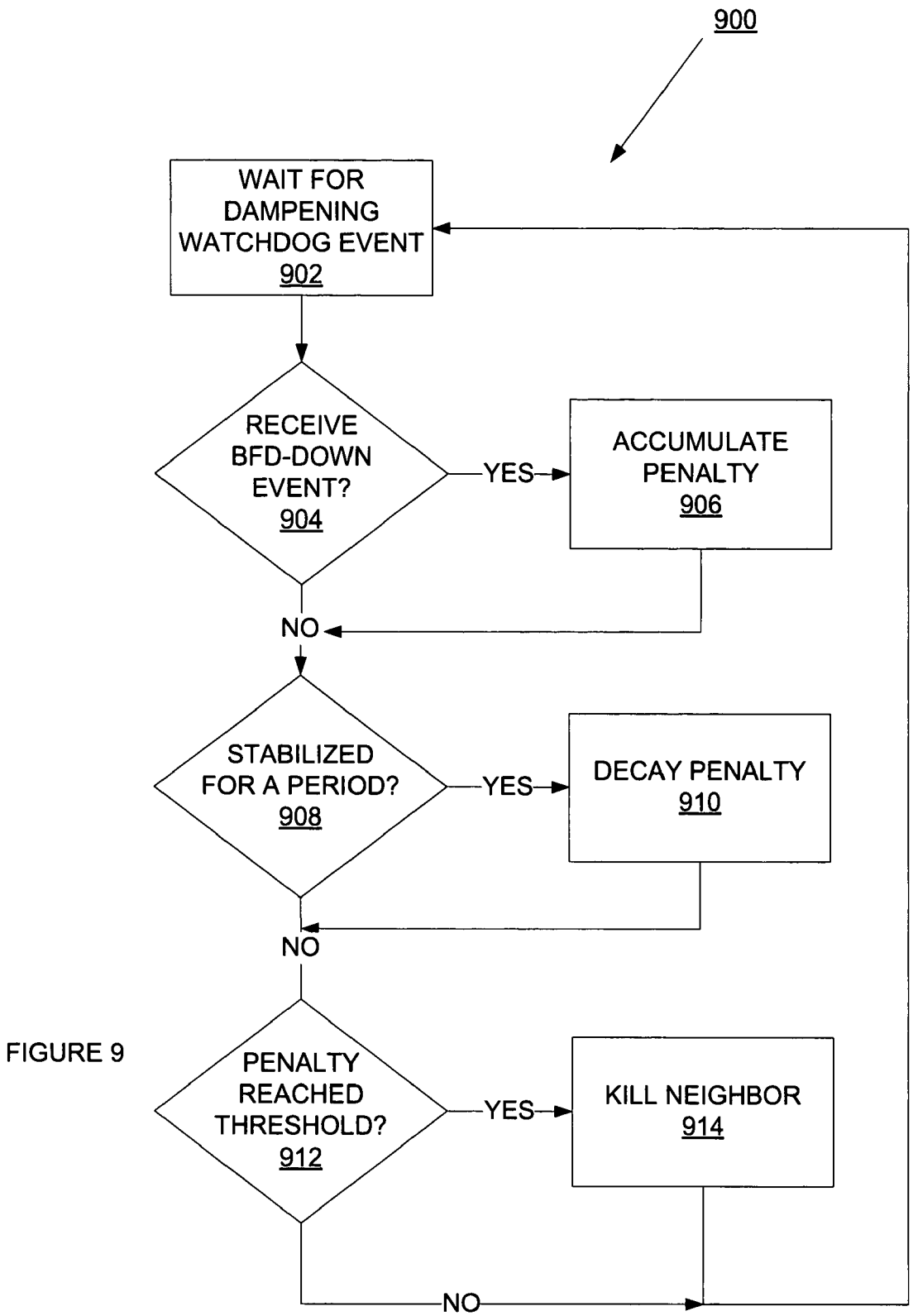
FIG. 9 is an exemplary flow diagram of a dampening watchdog event handler according to one embodiment of the invention.

FIG. 9 is an exemplary flow diagram of a dampening watchdog event handler method 900 according to one embodiment of the system. The dampening watchdog is used to determine when a link is excessively flapping between link up and link down. In FIG. 9, at block 902, method 900 waits for a dampening watchdog event. A dampening watchdog event is an event that affects that link state between the two adjacent nodes. While in one embodiment, a dampening watchdog event can be one of BFD-Down and/or BFD-Up, in alternate embodiments, a dampening watchdog the same and/or different events (e.g., stabilization reached, etc.). At block 904, method determines if method 900 received a BFD-Down event. If so, method 900 accumulates the dampening penalty. As per above, the dampening penalty is used to control when a link should be brought down to the Down state, so as to allow the link to fully recover. Control moves to block 908. If method 900 did not receive a BFD-Down event, control moves to block 908.

At block 908, method 900 determines whether the link has stabilized for a sufficient period of time and needs no or lessened dampening. In one embodiment, method 800 determines if the link has stabilized by the passage of time since the last state change with the link is greater than a stabilization threshold. If method 900 determines that the link has stabilized, method 900 decays the penalty at block 910. While in one embodiment, method 900 decrements the penalty by a constant, in alternate embodiment, method 900 decrements the penalty using decay techniques known in the art (e.g., apply a decay function to the penalty, geometric decay, adaptive decays, etc.). Control moves to block 912. If method 900 determines the link has not stabilized for a period, control moves to block 912.

At block 912, method 900 determines if the penalty has reached (or exceeded) the penalty threshold. As stated above, the penalty threshold represents a measure that can indicate that the link state changes occur too frequently and that it might be better for the routing protocol engine to reset the link than to continue responding to the high volume of link state changes. If method 900 determines that the penalty has reached the threshold, method 900 kills the link associated with that neighbor, at block 914. While in one embodiment, method 900 sends a KillNbr 324 event to the routing engine, in alternate embodiments, method 900 can kill the link associated with the neighbor using other techniques known in the art. Control passes to block 902. If the penalty is below the threshold, control passes to block 902.

Figure 10:
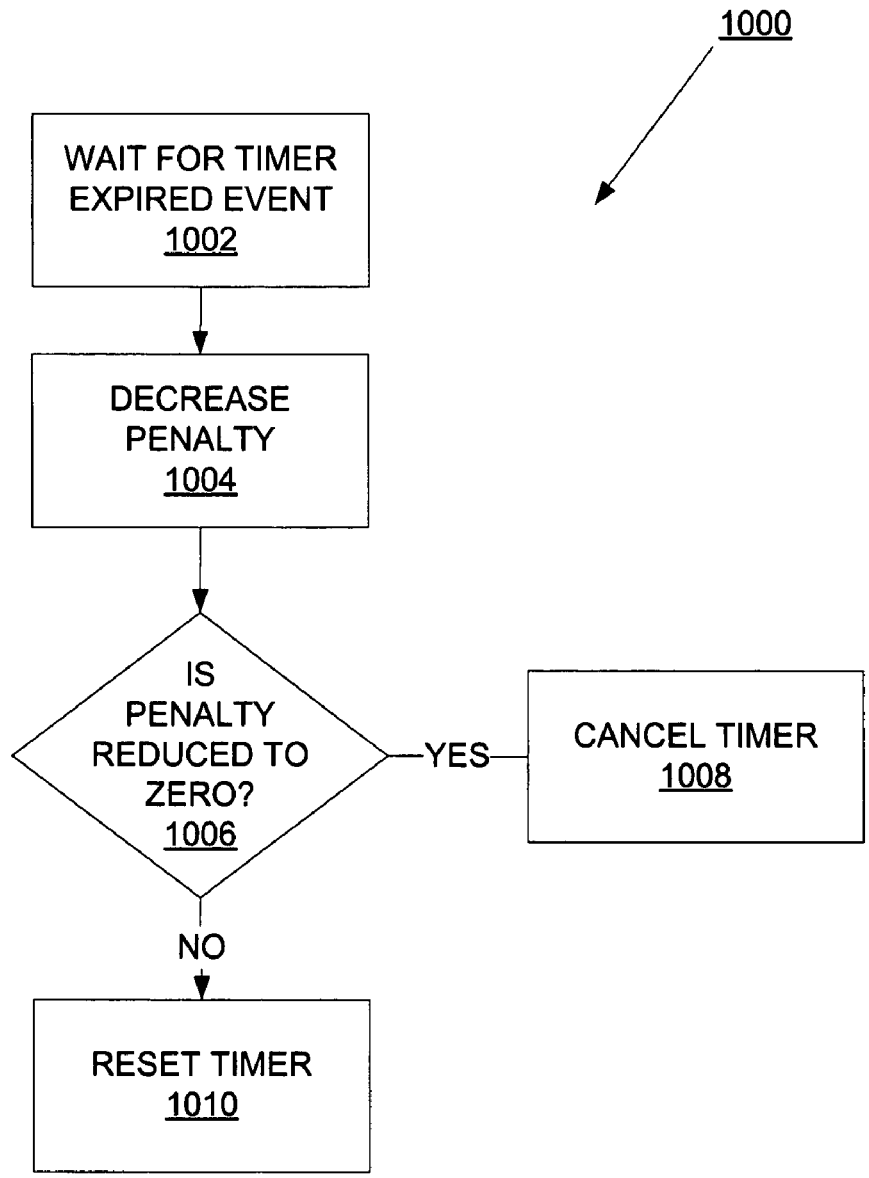
FIG. 10 is an exemplary flow diagram of a penalty decay timer according to one embodiment of the invention.

FIG. 10 is an exemplary flow diagram of a method 1000 for a penalty decay timer according to one embodiment of the system. In FIG. 1000, at block 1002, method 1000 waits for a timer expired event. A timer is used to measure the length of time needed for a link to be dampened if the link goes up and down during that time. If the timer has expired, method 1000 decreases the penalty at block 1004. While in one embodiment, method 1000 decreases the penalty by a constant amount, in alternate embodiments, method 1000 decreases the penalty in other ways known in the art (geometric decrease, decay based on a half-life function, half-time algorithm, etc. At block 1006, method 1000 determines if the penalty is reduced to zero. If the penalty is at zero, method 1000 cancels the timer at block 1008. If the penalty is not at zero, method 1000 resets the timer and block 1010.

While the foregoing examples were described with reference to OSPF, the BFD Event handling mechanism as described is not so limited to just OSPF. The BFD Event handling mechanism applies to other routing protocols known in the art as well. FIG. 11 is a table 1100 illustrating an exemplary state diagram of a BFD-Down event received in a IS-IS database exchange neighbor state diagram according to one embodiment of the system. In table 1100, the adjacent state is the current state of the link between the host node and its neighbor. The state can be down, init, or up. A down state represents that the link is down between the host node and the neighbor node. An init state means that the neighboring state has identified itself as a neighbor node of the host node and the link between the two nodes is initializing. An up state means that the link between the two nodes is fully up.

A host node that receives a BFD-Down event for an adjacent link that is in the down, init, or up state has the link changed to the init state. If the host node receives an event signifying the adjacent node is in the init state, the host node updates its internal IS-IS table based on the current state of the link. If the adjacent state link is in the down state, a received state of init changes that state to init. For an adjacent state currently in the init or down state, a received state of init puts the adjacent state to the up state. Furthermore, a received state of up puts the adjacent state in the down state (if the original state was down) of the up state (if the original state was init or up).

Furthermore, if the host node receives a received state of init for a link, the adjacent state of that link changes to init, up, and up for a current adjacent state on down, init, and up, respectively. Similarly, if the host node receives a state of up for the a link, the adjacent state of that link changes to down, up, up, for a current adjacent state of down, init, and up, respectively.

Figure 12:
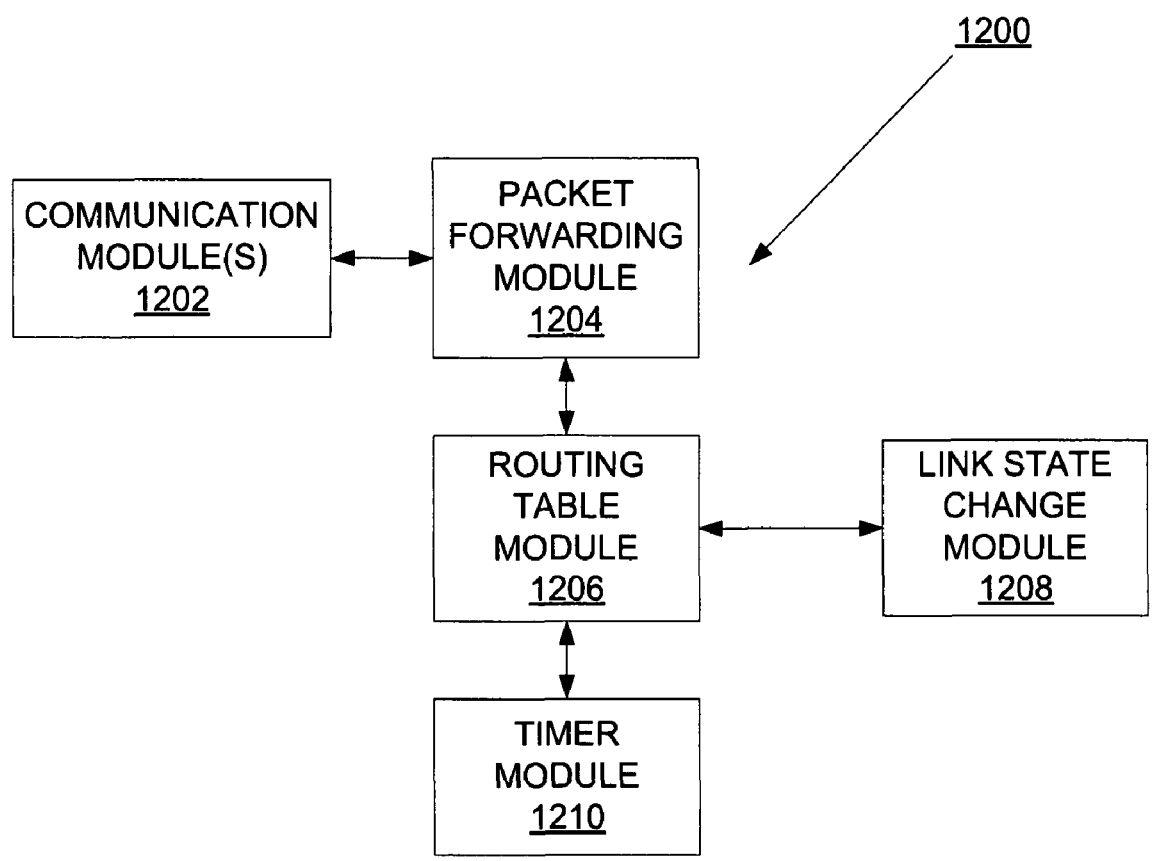
FIG. 12 is a block diagram of a system that handles BFD state changes according to one embodiment of the invention.

FIG. 12 is a block diagram of a system 1200 that handles BFD state changes according to one embodiment of the invention. In FIG. 12, system 1200 comprises communications module(s) 1202, packet forwarding module 1204, routing table module 1206, link state change module 1208, and timer module 1210. Communication module(s) 1202 couple to packet forwarding module 1204 and receive and transmits packets to the coupled network. Packet forwarding module 1204 further couples to routing table module 1206 and process packets by determining which communication module transmits a particular packet. Routing table module 1206 further couples to link state change module 1208 and timer module 1210. Routing table module 1206 maintains and updates routing tables for one or more routing protocols. While in one embodiment, routing table module 1206 maintains and updates a routing table for OSPF routing protocol, in alternate embodiments, routing table module 1206 maintains and updates the same and/or different routing protocols (IS-IS, etc.). Furthermore, routing table module 1206 maintains and updates the routing table(s) for each routing protocol by receiving link status information from link state change module 1208 and timer module 1210. Link state change module 1208 monitors for link state changes and forwards those changes to routing protocol module 1206, as described in FIGS. 3-6 and 11. While in one embodiment, link state change module monitors for and forwards link state changes using the BFD protocol, in alternate embodiments, link state change module 1208 employs other schemes known in the art. Timer module 1210 manages the timers used for link dampening as described in FIGS. 7-10.

Figure 13:
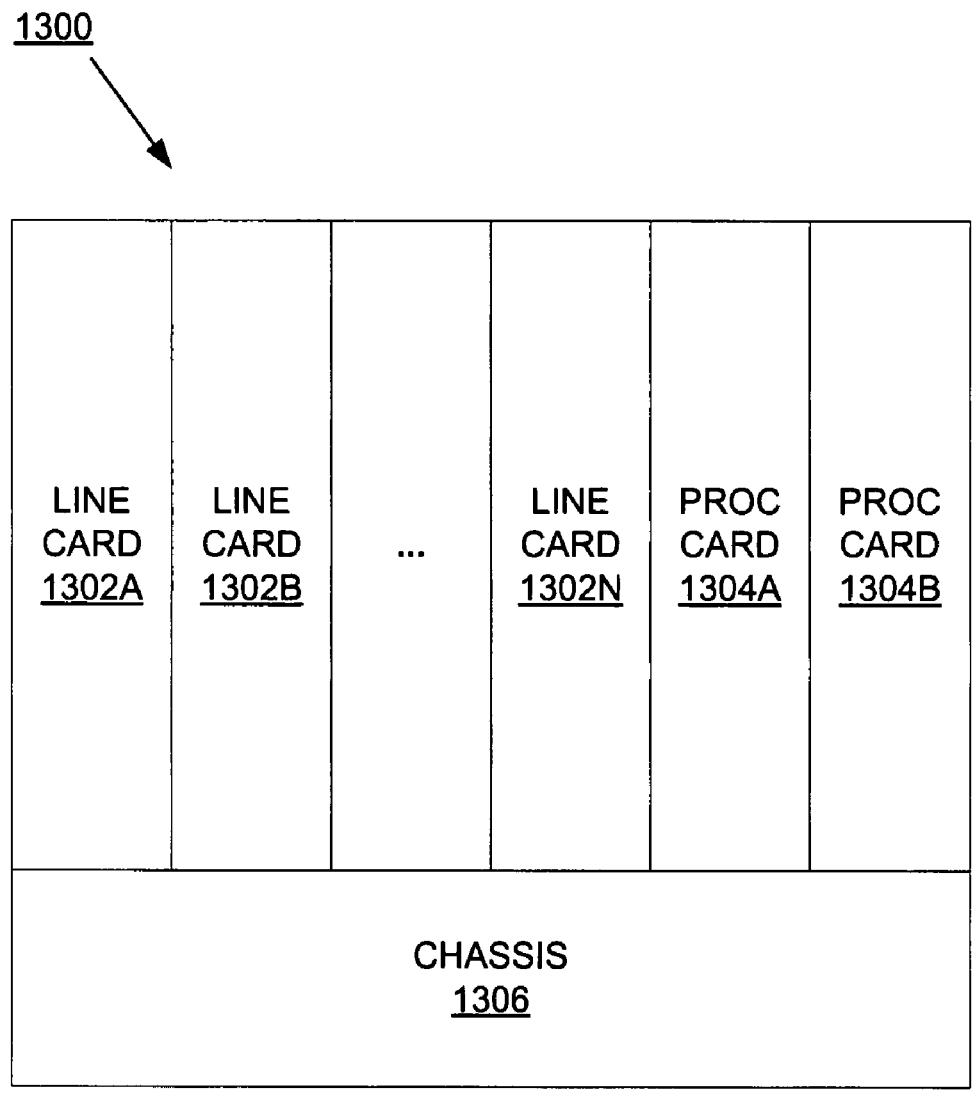
FIG. 13 is a block diagram illustrating a network element that includes improved handling of BFD state changes according to one embodiment of the invention.

FIG. 13 is a block diagram illustrating a network element 1300 that includes improved handling of BFD state changes according to one embodiment of the system. While in one embodiment of the invention chassis 1306 is coupled to line cards 1302A-N and processing cards 1304A-B, other embodiments of the invention describe multiple other devices and/or modules coupled to chassis 1306. While in one embodiment, system 1200 may be in line cards 1302A-N and/or processing cards 1304A-B, alternate embodiments may have alternate card arrangements (a combined line and processing card with one or more ports and a forwarding engine, one processing card per line card, multiple processing cards per line card, etc.). Network element 1300 includes line cards 1302A-N to forward packets. Network element 1300 also includes processing cards 1304A-B to process route changes, to manage subscription information, etc.

A node that processes link down events from a link fault protocol for use with a routing protocol has been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computerized method comprising:
   receiving a link down event associated with a link fault protocol for a link between a first node and a neighboring node;
   removing a data structure associated with the neighboring node from a forwarding table with a routing protocol running on the first node, in response to receiving the link down event;
   reserving the data structure for adjacency recovery;
   placing the neighboring node in the initialize state of the routing protocol;
   resetting a penalty decay timer;

increasing a penalty associated with the penalty decay timer; and triggering a kill neighbor event of the routing protocol for the first node that places the neighboring node in the down state if the penalty exceeds a threshold.

2. The computerized method of claim 1, further comprising:

notifying other nodes of the link down; and withdrawing a set of affected routes from the forwarding table.

3. The computerized method of claim 1, further comprising:

receiving a link up event associated with the link fault protocol;

adding the data structure to the forwarding table; and placing the neighboring node in the up state of the routing protocol.

4. The computerized method of claim 3, further comprising:

sending a hello message to the neighboring node.

5. The computerized method of claim 3, further comprising:

electing a dominant router for the routing protocol;

notifying other routers of the link up; and reinstalling the set of affected routes.

6. The computerized method of claim 1, further comprising:

triggering a one-way event of the routing protocol for the first node that places the neighboring node in the initialize state of the routing protocol if the penalty is less than or equal to a threshold.

7. The computerized method of claim 1, wherein the link fault protocol is bidirectional forwarding detection protocol.

8. The computerized method of claim 1, wherein the routing protocol is one of open shortest path first (OSPF) and intermediate system to intermediate system (IS-IS).

9. A non-transitory tangible machine-readable storage medium that stores computer executable instructions, which when executed by a set of one or more processors, cause said set of processors to perform operations comprising:

receiving a link down event associated with a link fault protocol for a link between a first node and a neighboring node;

removing a data structure associated with the neighboring node from a forwarding table with a routing protocol running on the first node, in response to receiving the link down event;

reserving the data structure for adjacency recovery;

placing the neighboring node in the initialize state of the routing protocol;

resetting a penalty decay timer;

increasing a penalty associated with the penalty decay timer; and triggering a kill neighbor event of the routing protocol for the first node that places the neighboring node in the down state if the penalty exceeds a threshold.

10. The non-transitory tangible machine-readable storage medium of claim 9, further comprising:

notifying other nodes of the link down; and withdrawing a set of affected routes from the forwarding table.

11. The non-transitory tangible machine-readable storage medium of claim 9, further comprising:

receiving a link up event associated with the link fault protocol;

adding the data structure to the forwarding table; and placing the neighboring node in the up state of the routing protocol.

12. The non-transitory tangible machine-readable storage medium of claim 11, further comprising:

sending a hello message to the neighboring node.

13. The non-transitory tangible machine-readable storage medium of claim 11, further comprising:

electing a dominant router for the routing protocol;

notifying other routers of the link up; and reinstalling the set of affected routes.

14. The non-transitory tangible machine-readable storage medium of claim 9, further comprising: triggering a one-way event of the routing protocol for the first node that places the neighboring node in the initialize state of the routing protocol if the penalty is less than or equal to a threshold.

15. The non-transitory tangible machine-readable storage medium of claim 9, wherein the link fault protocol is bidirectional forwarding detection protocol.

16. The non-transitory tangible machine-readable storage medium of claim 9, wherein the routing protocol is one of open shortest path first (OSPF) and intermediate system to intermediate system (IS-IS).

17. An apparatus comprising:

a link state change module to generate a link down event; and a routing table module to receive the link down event associated with a link fault protocol for a link between a first node and a neighboring node, remove a data structure associated with the neighboring node from a forwarding table with a routing protocol running on the first node, in response to receiving the link down event, reserve the data structure for adjacency recovery, place the neighboring node in the initialize state of the routing protocol, a timer module to reset a penalty decay timer and increase a penalty associated with the penalty decay timer, and wherein the routing table module triggers a kill neighbor event of the routing protocol for the first node that places the neighboring node in the down state if the penalty exceeds a threshold.

18. The apparatus of claim 17, wherein the routing table module notifies other nodes of the link down and withdraws a set of affected routes from the forwarding table.

19. The apparatus of claim 17, wherein the link state change module generates a link up event associated with the link fault protocol, and the routing table module receives the link up event associated with the link fault protocol, adds the data structure to the forwarding table, and places the neighboring node in the up state of the routing protocol.

20. The apparatus of claim 17, wherein the routing table module triggers a one-way event of the routing protocol for the first node that places the neighboring node in the initialize state of the routing protocol if the penalty is less than or equal to a threshold.

21. A network element comprising:

a set of one or more line cards, wherein each line card is configured to, receive a link down event associated with a link fault protocol for a link between a first node and a neighboring node, remove a data structure associated with the neighboring node from a forwarding table with a routing protocol running on the first node, in response to receiving the link down event, reserve the data structure for adjacency recovery, and place the neighboring node in the initialize state of the routing protocol;

a set of one or more control cards, the control cards to control forwarding of packets between the set of one or more line cards;

wherein the each line card is configured to reset a penalty decay timer and increase a penalty associated with the penalty decay timer; and wherein the each line card is configured to trigger a kill neighbor event of the routing protocol for the first node that places the neighboring node in the down state if the penalty exceeds a threshold.

22. The network element of claim 21, wherein the each line card is configured to notify other nodes of the link down and withdraw a set of affected routes from the forwarding table.

23. The network element of claim 21, wherein the each line card is configured to receive a link up event associated with the link fault protocol, add the data structure to the forwarding table, and place the neighboring node in the up state of the routing protocol.

24. The network element of claim 21, wherein the each line card is configured to trigger a one-way event of the routing protocol for the first node that places the neighboring node in the initialize state of the routing protocol if the penalty is less than or equal to a threshold.

* * * * *

UNITED STATES PATENT AND TRADEMARK OFFICE
CERTIFICATE OF CORRECTION

| | | |
|---|---|---|
| PATENT NO. | : 7,961,601 B2 | Page 1 of 1 |
| APPLICATION NO. | : 11/894249 | |
| DATED | : June 14, 2011 | |
| INVENTOR(S) | : Lu et al. | |

It is certified that error appears in the above-identified patent and that said Letters Patent is hereby corrected as shown below:

In Column 4, Line 38, delete "has bee" and insert -- has been --, therefor.

Signed and Sealed this
Tenth Day of January, 2012

David J. Kappos
*Director of the United States Patent and Trademark Office*